United States Patent [19]
DeBalko et al.

[11] Patent Number: 5,515,435
[45] Date of Patent: May 7, 1996

[54] NETWORK INTERFACE DEVICE WITH APERTURES FOR HOLDING FLEXIBLE COAXIAL CABLE CONNECTOR

[75] Inventors: George A. DeBalko, Township of Washington, Morris County; Antonio A. Figueiredo, Belleville, both of N.J.; James R. Hulsey, Canton, Ga.; Paul M. Muller, Township of Byram, Sussex County, N.J.

[73] Assignee: AT&T Corp., Murray Hill, N.J.

[21] Appl. No.: 344,300

[22] Filed: Nov. 23, 1994

[51] Int. Cl.⁶ .................................................. H04M 11/00
[52] U.S. Cl. .............................. 379/399; 379/412; 348/8; 361/600
[58] Field of Search ................................ 358/86; 361/600, 361/640, 658, 827, 601, 602, 641, 823, 826, 828; 379/397, 399, 412, 413, 326; 348/8, 6, 7, 10; 339/90

[56] References Cited

U.S. PATENT DOCUMENTS

| | | | |
|---|---|---|---|
| 3,610,810 | 10/1971 | Fribley, Jr. | 361/641 X |
| 4,764,849 | 8/1988 | Khan | 361/827 |
| 4,785,376 | 11/1988 | Dively | 361/641 X |
| 4,794,490 | 12/1988 | Epstein | 361/827 |
| 4,887,187 | 12/1989 | Nickola | 361/826 X |
| 4,945,559 | 11/1990 | Collins et al | 379/399 |
| 4,979,209 | 12/1990 | Collins et al. | 379/399 |
| 5,327,114 | 7/1994 | Straate et al. | 340/286.06 |
| 5,363,432 | 11/1994 | Martin et al. | 379/90 |
| 5,394,466 | 2/1995 | Schneider et al. | 379/399 |

OTHER PUBLICATIONS

Pat. No. 4,945,559 filed on Nov. 7, 1989 and issued on Jul. 31, 1990 to Collins et al. Class: 379/399 *Comment:* Cited in the specification for showing a typical network interface device which can incorporate the present invention.

*Primary Examiner*—Jeffery Hofsass
*Assistant Examiner*—Scott L. Weaver
*Attorney, Agent, or Firm*—Lester H. Birnbaum

[57] ABSTRACT

Disclosed is a device providing an interface between a customer and a combination telephone and broadband network. The device includes two adjacent compartments, one including connections to the network and the other including connections to the customer. The broadband connection is provided by a flexible coaxial jumper cable with one end fixedly mounted in the network compartment and the other end free to move in the customer compartment.

5 Claims, 3 Drawing Sheets

5,515,435

NETWORK INTERFACE DEVICE WITH APERTURES FOR HOLDING FLEXIBLE COAXIAL CABLE CONNECTOR

BACKGROUND OF THE INVENTION

This invention relates to a network interface device.

In the coming information superhighway, voice, data, and broadband (TV) signals will be supplied to each customer from an integrated network. In at least one version, the signals will be provided to each customer by means of a coaxial cable and tip and ring wires connected to a network interface device on the side of each customer's house. Typical interface devices now include two adjacent compartments separated by an apertured wall. One compartment includes the customer connections to the Plain Old Telephone Service (POTS) wires, and the other compartment, which is accessible only by telephone personnel, includes the connections to the network. The network compartment also includes protectors and a ground bar for providing the necessary ground connection for the protectors. (See, e.g., U.S. Pat. No. 4,945,559 issued to Collins et al.)

A problem exists as to how to couple an incoming coaxial cable to a customer in an economical way which can utilize existing interface devices and permit the customer to easily connect to the network.

SUMMARY OF THE INVENTION

The invention is a device providing an interface between a customer and a combination telephone and broadband network. The device includes a first compartment including terminals adapted for electrical connection to network telephone wires and means for receiving a network coaxial cable. A second compartment is provided adjacent to the first compartment. The second compartment includes terminals adapted for connection to customer telephone wires and means for receiving a customer coaxial cable. A flexible coaxial jumper cable with coaxial connectors on both ends is mounted so that one end is fixedly mounted in the first compartment while the other end is free to move in the second compartment.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION OF THE INVENTION

Figure 1:
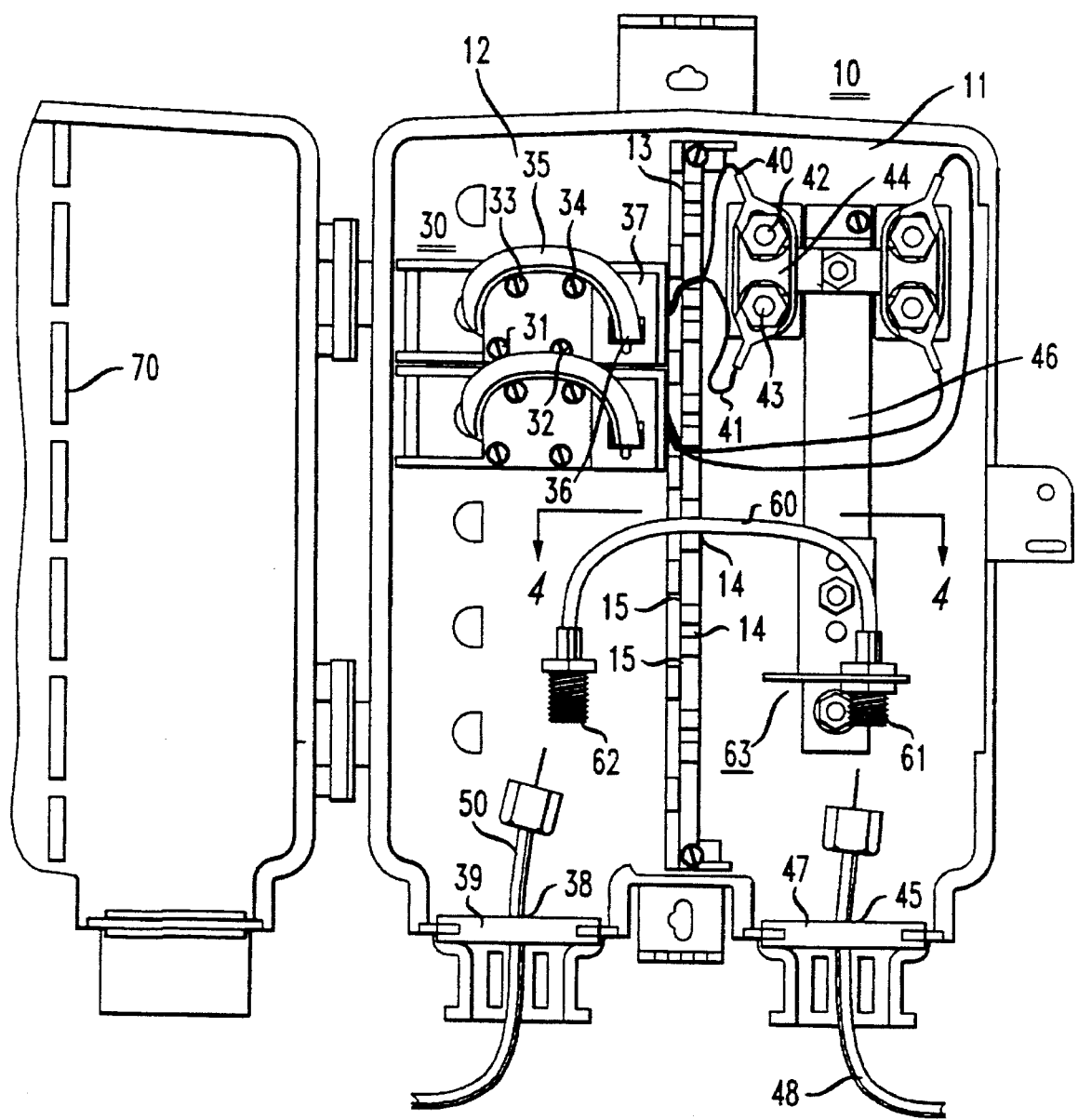
FIG. 1 is a plan view of a network interface device in accordance with an embodiment of the invention.
Figure 3:
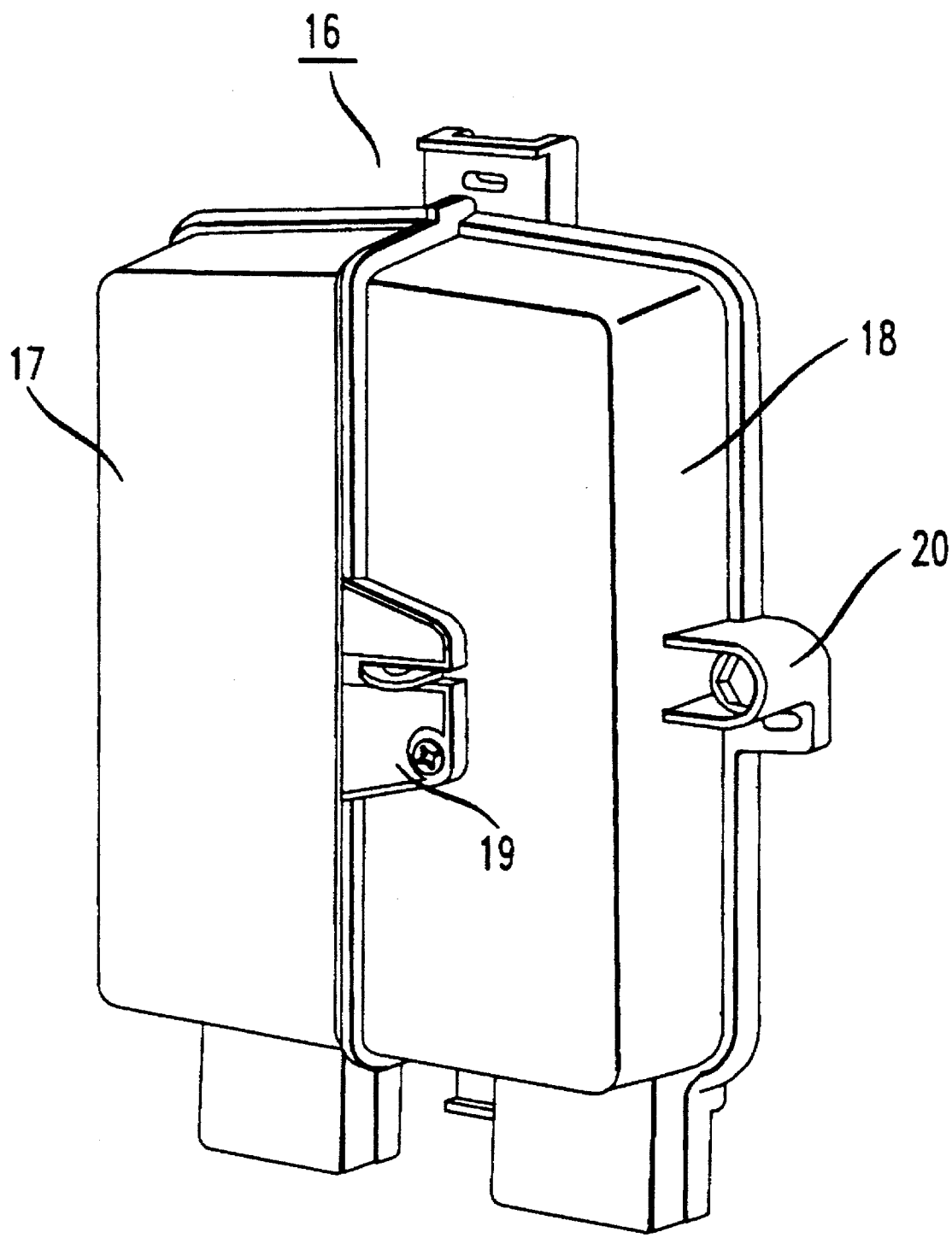
FIG. 3 is a plan view of the apparatus of FIG. 1 with a cover in a closed position.

As illustrated in FIG. 1, the network interface device, 10, includes two adjacent compartments, 11 and 12, which are separated by a wall, 13. The wall has a series of apertures, e.g., 14 and 15, therein to permit connections to be made between the compartments. The compartments are covered by a door, 16, which is in an open position in FIG. 1 and a closed position in FIG. 3. As shown in FIG. 3, the door, 16, includes two portions, one of which, 17, can be opened by the customer by unscrewing a screw, 19, and the other of which, 18, can be opened only by network personnel by unscrewing a screw, 20.

Returning to FIG. 1, the compartment, 12, which is accessible by the customer, includes a plurality of Plain Old Telephone Service (POTS) terminals (customer bridges), only two of which are shown (one labeled as 30) in the figure for the sake of clarity. The terminal, 30, has four screws, 31–34, which are adapted for electrical connection to the customer premises equipment (not shown). The screws, 31–34, are also coupled to wires (not shown) which are protected by a non-metallic sheath, 35, and which terminate in a standard RJ 11 plug, 36. The plug, 36, is coupled to a standard RJ 11 jack, 37, which is electrically coupled to a pair of wires, 40 and 41, extending through one of the apertures, 15.

The compartment, 11, which is accessible only to network personnel, receives the wires, 40 and 41, extending through the aperture, 15, from the customer compartment, 12. The wires, 40 and 41, are coupled to respective terminals, 42 and 43, which are part of a standard station protector, 44. The protector, 44, is electrically coupled to the outside cable (not shown) through a pair of wires (not shown) which extend through an aperture, 45, in the bottom of the compartment housing. The protector, 44, is also electrically coupled to a metal bar, 46, which is mounted to the back wall of the compartment, 11, and which is grounded. The aperture, 45, which includes a grommet, 47, therein, is also adapted to receive a coaxial cable, 48, from the network.

Figure 2:
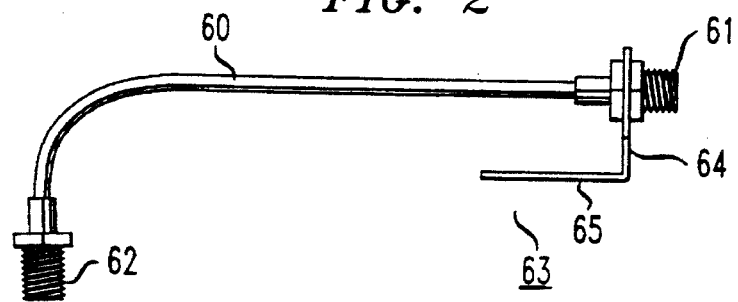
FIG. 2 is a plan view of a portion of the apparatus of FIG. 1.

In accordance with a feature of the invention, the network coaxial cable, 48, is electrically coupled to a cable, 50, extending through an aperture, 38, in the customer compartment, 12. This is accomplished utilizing a coaxial jumper cable, 60, also shown in FIG. 2, which has a female coaxial connector, 61 and 62, on both ends. One of the connectors, 61, is mounted within an aperture in a leg, 64, of a right angle bracket, 63. The leg, 64, can include a plurality of adjacent apertures to accommodate a plurality of jumper cables, although only one jumper cable, 60, is shown. The other leg, 65, of the bracket, 63, is mounted to the ground bar, 46, by means of a screw extending from the bar and through a further aperture (not shown) in the leg, 65. On boxes without a ground bar, the bracket can mount to the bottom of the compartment, 11, or to a raised plastic platform (not shown) mounted thereon, and a short wire connected to a screw (not shown) which is coupled to ground.

Figure 4:
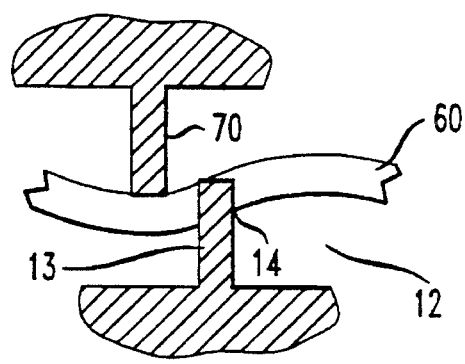
FIG. 4 is a cross-sectional view along line 4—4 of FIG. 1.

The coaxial jumper cable, 60, is positioned within one of the apertures, 14, in the wall, 13, between the compartments so that the connector, 62, which is not mounted to the bracket, 63, lies inside the customer compartment, 12. The diameter of the jumper cable, 60, and the size of the aperture, 14, are such that the cable fits snugly within the aperture while the end including the connector, 62, is free to move in the customer compartment, 12. Preferably, the portion of the cable contacting the wall, 13, is stationary so that the cable pivots about the sides of the aperture, 14. Some vertical movement of the cable (out of the plane of FIG. 1 ) is permissible since a slotted wall, 70, in the cover, 16, will be positioned adjacent to the wall, 13, in the compartment 11 when the network portion, 18 of the cover is closed and will keep the jumper cable, 60, within the vertical confines of the aperture, 14 as illustrated in the view of FIG. 4 even when the customer portion, 17, of the cover is opened. For example, the jumper cable, 60, can have a diameter of 4–6 mm, while the aperture, 14, can have a width of ≈2 mm.

Thus, one advantage of the invention is that the customer can easily connect his or her coaxial cable, 50, to the network cable, 48, when the network portion of the cover is closed by manipulating the end of the jumper cable, 60, including the connector, 62, at any desired angle to make the connection to the cable, 50. If the end of the jumper, 60, were fixed, the customer may have trouble making the connection in the small space provided in the customer compartment which is not occupied by the POTS terminals, 30.

Figure 5:
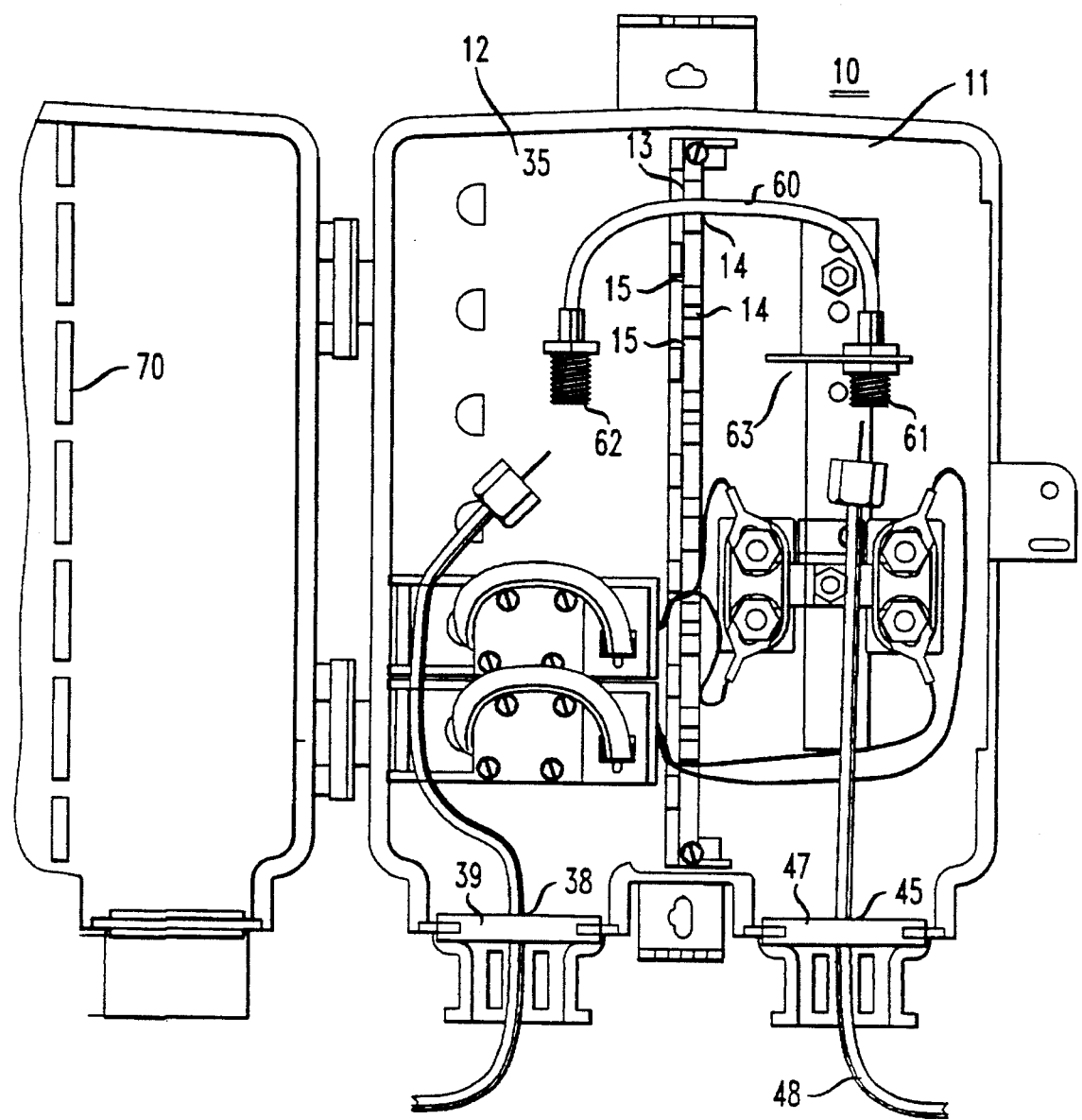
FIG. 5 is a plan view of a view of a network interface device in accordance with a further embodiment of the invention.

While the jumper cable, 60, is shown mounted at the bottom of the compartments, 11 and 12, in FIG. 1, one of the further advantages of the invention is the fact that the jumper cable can be mounted at any position which does not include a POTS terminal. Thus, for example, the jumper cable, 60, could be mounted above POTS terminal, 30, as shown in FIG. 5, since the customer could still manipulate the end of the jumper sufficiently to make connection to the customer cable, 50. This may not be the case if the end of the jumper were stationary. This feature allows retrofitting a cable connection without having to rearrange the positions of the existing POTS terminals.

Further, the invention can be used in devices which have no wall, 13, separating the compartments. However, a wall with apertures therein is preferred since it provides strain relief for the jumper cable 60.

We claim:

1. A device for providing an interface between a customer and a combination telephone and broadband network comprising:

a first compartment including at least one terminal adapted for electrical connection to network telephone wires, and further including a ground bar and means for receiving a network coaxial cable;

a second compartment adjacent to the first compartment, the second compartment including at least one terminal adapted for connection to customer telephone wires, and further including means for receiving a customer coaxial cable;

a flexible coaxial jumper cable with at least two opposite ends including coaxial connectors on said ends, one end of the jumper cable being fixedly mounted in the first compartment while the opposite end of the jumper cable is free to move in the second compartment; and a wall including a plurality of apertures separating the first and second compartments, a portion of the jumper cable being held in one of the apertures, the aperture having sides and a size such that the portion of the jumper cable held therein is stationary and the jumper cable pivots about the sides of the aperture.

2. The device according to claim 1 wherein the end of the jumper cable fixedly mounted in the first compartment is mounted to the ground bar in the first compartment by means of a bracket.

3. The device according to claim 2 wherein the bracket includes two legs and the connector at said one end of the jumper cable is mounted within an aperture in one of the legs while the other leg is mounted to the ground bar.

4. The device according to claim 1 wherein the device further includes a cover having separate portions which cover the first and second compartments, and a second wall attached to the portion which covers the first compartment which prevents movement of the portion of the jumper cable out of the aperture when the cover is in a closed position over the first compartment and the second compartment is open.

5. The device according to claim 1 wherein the jumper cable is mounted above said at least one terminal adapted for connection to customer telephone wires in the second compartment.

\* \* \* \* \*